(12) United States Patent
Notani et al.

(10) Patent No.: US 10,268,250 B2
(45) Date of Patent: *Apr. 23, 2019

(54) SEMICONDUCTOR DEVICE HAVING ACTIVE MODE AND STANDBY MODE

(71) Applicant: Renesas Electronics Corporation, Tokyo (JP)

(72) Inventors: Hiromi Notani, Tokyo (JP); Takayuki Fukuoka, Tokyo (JP); Takashi Yamaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 15/649,051

(22) Filed: Jul. 13, 2017

(65) Prior Publication Data

US 2017/0308138 A1 Oct. 26, 2017

Related U.S. Application Data

(63) Continuation of application No. 14/134,537, filed on Dec. 19, 2013, now Pat. No. 9,727,106.

(30) Foreign Application Priority Data

Dec. 28, 2012 (JP) ................................. 2012-286531

(51) Int. Cl.
*G06F 1/26* (2006.01)
(52) U.S. Cl.
CPC .................................. *G06F 1/263* (2013.01)
(58) Field of Classification Search
None
See application file for complete search history.

(56) References Cited

U.S. PATENT DOCUMENTS

| | | | |
|---|---|---|---|
| 6,281,724 B1 | 8/2001 | Ellis | |
| 6,775,784 B1* | 8/2004 | Park | G06F 1/3203 713/320 |
| 8,078,887 B2 | 12/2011 | Matsui | |
| 8,314,632 B1 | 11/2012 | Liu | |
| 2006/0087361 A1 | 4/2006 | Bhagavatheeswaran | |
| 2006/0119991 A1 | 6/2006 | Garg | |
| 2008/0222436 A1 | 9/2008 | Matsui | |
| 2011/0317501 A1 | 12/2011 | Jinbo | |
| 2012/0025612 A1* | 2/2012 | Tsai | H02J 9/005 307/52 |
| 2012/0275256 A1 | 11/2012 | Furutani | |
| 2014/0157029 A1* | 6/2014 | Takahashi | G06F 1/263 713/323 |

FOREIGN PATENT DOCUMENTS

JP 2008-217509 A 9/2008

* cited by examiner

*Primary Examiner* — Kim Huynh
*Assistant Examiner* — Kevin M Stewart
(74) *Attorney, Agent, or Firm* — McGinn IP Law Group, PLLC (57) ABSTRACT

A semiconductor device having an active mode and a standby mode as operation modes, includes a first power supply line supplied with a first internal power supply voltage from a first external power supply and an internal power supply circuit generating a second internal power supply voltage based on an external power supply voltage from a second external power supply circuit. A second power supply line supplied with said second internal power supply voltage from said internal power supply circuit.

14 Claims, 8 Drawing Sheets

SEMICONDUCTOR DEVICE HAVING ACTIVE MODE AND STANDBY MODE

This Application is a Continuation Application of U.S. patent application Ser. No. 14/134,537, filed on Dec. 19, 2013, now U.S. Pat. No. 9,727,106.

BACKGROUND OF THE INVENTION

Field of the Invention

The present invention relates to power supply control in a semiconductor device having an active mode and a standby mode as operation modes.

Description of the Background Art

A semiconductor device such as a microcomputer includes a power supply circuit for generating a power supply voltage (hereinafter also referred to as "internal power supply voltage") supplied to an internal circuit. Widely used as the aforementioned semiconductor device is a semiconductor device configured to switch the operated power supply circuits based on whether the semiconductor device is in operation (in the active mode) or the semiconductor device is on standby (in the standby mode).

The power supply circuits need to generate the stable power supply voltage both in the active mode and in the standby mode of the semiconductor device. Therefore, the power supply circuit having a high power supply capability is used in the active mode in which power consumption is large and voltage drop occurs easily, whereas the power supply circuit with reduced power consumption is used to achieve lower power consumption in the standby mode in which power consumption is small.

When switch control is executed between an output of an on-chip regulator and an external power supply in a chip having multiple power supplies, it is necessary to sequentially raise a plurality of power supply voltages in accordance with a predetermined power supply startup sequence when power is turned on, so as not to cause a trouble that each circuit is biased in the forward direction. This startup sequence control imposes restrictions on the user. The other problems and novel features will become more apparent from the description of the specification and the accompanying drawings.

SUMMARY OF THE INVENTION

A semiconductor device according to an embodiment has an active mode and a standby mode as operation modes. The semiconductor device includes: a first power supply line supplied with a first internal power supply voltage from an external power supply circuit in the active mode; an internal power supply circuit generating a second internal power supply voltage based on an external power supply voltage; a second power supply line supplied with the second internal power supply voltage from the internal power supply circuit; a PMOS switch connected between the first power supply line and the second power supply line; and a control circuit controlling ON/OFF of the PMOS switch. The PMOS switch includes: a first PMOS transistor having a source and an N-type well connected to the first power supply line; a second PMOS transistor having a source and an N-type well connected to the second power supply line and a drain connected to a drain of the first PMOS transistor; a first control signal generating unit for generating a first control signal inputted to a gate of the first PMOS transistor, based on the control command from the control circuit and a voltage of the second power supply line; and a second control signal generating unit for generating a second control signal inputted to a gate of the second PMOS transistor, based on the control command and a voltage of the first power supply line.

According to the aforementioned embodiment, the power supply startup sequence can be freed in the semiconductor device configured to switch the operated power supply circuits based on whether the semiconductor device is in the active mode or in the standby mode.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment will be described in detail hereinafter with reference to the drawings. The same or corresponding portions are denoted by the same reference characters and description thereof will not be repeated.

First Embodiment

Before describing a semiconductor device according to an embodiment, power supply control in a semiconductor device according to the related art will be described first. Next, main portions of the semiconductor device according to the embodiment will be described.

[Power Supply Control in Semiconductor Device According to Related Art]

Figure 9:
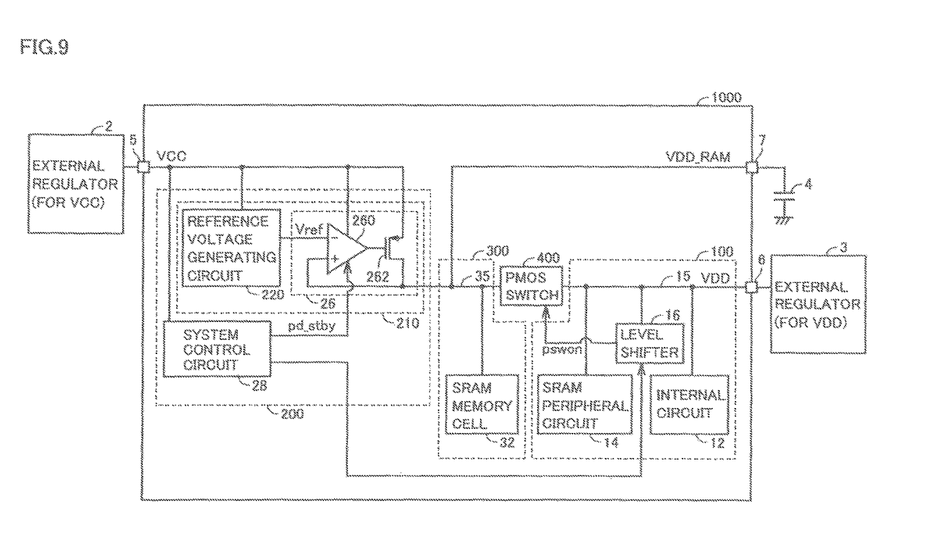
FIG. 9 is a circuit diagram showing an overall structure of a semiconductor device according to the related art.

FIG. 9 is a circuit diagram showing an overall structure of the semiconductor device according to the related art.

Referring to FIG. 9, a semiconductor device 1000 according to the related art includes a power supply terminal 5 that receives an external power supply voltage VCC supplied from outside semiconductor device 1000, an internal power supply circuit 210 that steps down external power supply voltage VCC and generates an internal power supply voltage, and a power supply line 15. Semiconductor device 1000 further includes an internal circuit 12, an SRAM (Static Random Access Memory) memory cell 32, an SRAM peripheral circuit 14, and a system control circuit 28.

Power supply terminal 5 receives external power supply voltage VCC generated by a regulator (hereinafter also referred to as "external regulator") 2 that is provided outside semiconductor device 1000. Internal power supply circuit 210 generates the internal power supply voltage obtained by stepping down external power supply voltage VCC, and supplies the generated internal power supply voltage to a power supply line 35. SRAM memory cell 32 is connected to power supply line 35. SRAM memory cell 32 is driven by receiving the internal power supply voltage supplied from power supply line 35. In the following description, the internal power supply voltage for driving SRAM memory cell 32 will be expressed as "internal power supply voltage VDD_RAM". In addition, power supply line 35 that transmits internal power supply voltage VDD_RAM will be expressed as "VDD_RAM line".

Internal power supply circuit 210 operates by external power supply voltage VCC. Internal power supply circuit 210 includes a reference voltage generating circuit 220 and an internal regulator 26. Reference voltage generating circuit 220 generates a reference voltage Vref obtained by stepping down external power supply voltage VCC. Reference voltage Vref is set at, for example, approximately 1.25 V. Internal regulator 26 generates internal power supply voltage VDD_RAM by referring to reference voltage Vref.

Specifically, internal regulator 26 includes an error amplifier 260 and a PMOS (Positive-channel Metal Oxide Semiconductor) transistor 262. Error amplifier 260 receives reference voltage Vref at an inverting input terminal (−terminal) and receives a feedback voltage from an output terminal of internal regulator 26 at a non-inverting input terminal (+terminal). Error amplifier 260 generates a control voltage in accordance with a voltage difference between reference voltage Vref and the feedback voltage, and supplies the generated control voltage to a control terminal (gate terminal) of PMOS transistor 262.

The control voltage outputted from error amplifier 260 becomes larger as the feedback voltage becomes larger than reference voltage Vref. As a result, a current flowing through PMOS transistor 262 decreases, and thus, an increase in the feedback voltage is suppressed. Conversely, the control voltage becomes smaller as the feedback voltage becomes smaller than reference voltage Vref. As a result, the current flowing through PMOS transistor 262 increases, and thus, a decrease in the feedback voltage is suppressed. In this manner, the feedback voltage becomes equal to reference voltage Vref (1.25 V).

The output terminal of internal regulator 26 is connected to VDD_RAM line 35. Therefore, an output voltage equal to reference voltage Vref is supplied to VDD_RAM line 35 as internal power supply voltage VDD_RAM.

Error amplifier 260 is controlled into an active state (ON state) or an inactive state (OFF state) in accordance with a control signal pd_stby provided from system control circuit 28. Specifically, error amplifier 260 enters the ON state by receiving control signal pd_stby rendered active to the L (logic low) level, and enters the OFF state by receiving control signal pd_stby rendered inactive to the H (logic high) level.

An external capacitance 4 is also attached to VDD_RAM line 35 via a power supply terminal 7 in order to stabilize internal power supply voltage VDD_RAM.

As a structure for directly receiving supply of the internal power supply voltage from outside semiconductor device 1000, semiconductor device 1000 further includes a power supply terminal 6, power supply line 15, a PMOS switch 400, and a level shifter 16.

Power supply terminal 6 receives the internal power supply voltage generated by an external regulator 3. Internal circuit 12, SRAM peripheral circuit 14 and level shifter 16 are connected to power supply line 15. When semiconductor device 1000 is, for example, a microcomputer, internal circuit 12 includes a CPU (Central Processing Unit), a rewritable non-volatile memory such as a flash memory, a logic circuit, a peripheral circuit and the like. SRAM peripheral circuit 14 includes a peripheral circuit such as a sense amplifier that is necessary for the write and read operation of SRAM memory cell 32, as well as a control circuit and the like. Internal circuit 12 and SRAM peripheral circuit 14 are driven by receiving the internal power supply voltage supplied from power supply line 15. In the following description, the internal power supply voltage for driving internal circuit 12 and SRAM peripheral circuit 14 will be expressed as "internal power supply voltage VDD". In addition, power supply line 15 that transmits internal power supply voltage VDD will be expressed as "VDD line". Internal power supply voltage VDD has the same voltage level as that of internal power supply voltage VDD_RAM and is set at, for example, approximately 1.25 V.

PMOS switch 400 is connected between VDD line 15 and VDD_RAM line 35. ON (conduction)/OFF (non-conduction) of PMOS switch 400 is controlled in accordance with a control signal pswon generated by system control circuit 28 and level-shifted by level shifter 16. Specifically, when control signal pswon is rendered active to the L level, PMOS switch 400 is turned on. As a result, VDD line 15 is electrically connected to VDD_RAM line 35. On the other hand, when control signal pswon is rendered inactive to the H level, PMOS switch 400 is turned off. As a result, VDD line 15 is electrically disconnected from VDD_RAM line 35.

As shown in FIG. 9, semiconductor device 1000 is divided into a region (hereinafter also referred to as "VDD power supply region") 100 in which the circuits operating by internal power supply voltage VDD are arranged, a region (hereinafter also referred to as "VCC power supply region") 200 in which the circuits operating by external power supply voltage VCC are arranged, and a region (hereinafter also referred to as "VDD_RAM power supply region") 300 in which the circuit operating by internal power supply voltage VDD_RAM is arranged. VDD power supply region 100 includes internal circuit 12, SRAM peripheral circuit 14 and level shifter 16. VCC power supply region 200 includes internal power supply circuit 210 and system control circuit 28. VDD_RAM power supply region 300 includes SRAM memory cell 32.

Semiconductor device 1000 described below has, as the operation modes, the active mode corresponding to the time when the semiconductor device is in operation and the standby mode corresponding to the time when the semiconductor device is on standby (also referred to as "the time when the semiconductor device is not in operation"). System control circuit 28 switches sources of the internal power supply voltages based on whether the semiconductor device is in the active mode or in the standby mode.

Specifically, in the active mode in which power consumption is large and voltage drop occurs easily because various circuit operations are performed, external regulator 3 having a high current supply capability is used to generate internal power supply voltage VDD. In VDD power supply region 100, internal circuit 12 and SRAM peripheral circuit 14 are driven by receiving supply of internal power supply voltage VDD from VDD line 15.

At this time, system control circuit 28 outputs control signal pswon rendered active to the L level to level shifter 16. PMOS switch 400 is turned on by receiving level-shifted control signal pswon, and thus, VDD line 15 is connected to VDD_RAM line 35. System control circuit 28 further generates control signal pd_stby rendered inactive to the H level and outputs control signal pd_stby to internal regulator 26. Since error amplifier 260 is turned off by receiving H-level control signal pd_stby, internal regulator 26 does not generate internal power supply voltage VDD_RAM. Therefore, VDD_RAM line 35 is supplied with internal power supply voltage VDD from VDD line 15 via PMOS switch 400. As described above, in the active mode, SRAM memory cell 32 is driven by internal power supply voltage VDD supplied from external regulator 3, similarly to internal circuit 12 and SRAM peripheral circuit 14.

In contrast to this, in the standby mode in which power consumption is small due to the standby state in which various circuit operations are not performed, internal regulator 26 with reduced power consumption is used to generate internal power supply voltage VDD_RAM in order to achieve lower power consumption. Specifically, in the standby mode, supply of internal power supply voltage VDD to internal circuit 12 and SRAM peripheral circuit 14 is unnecessary, while supply of internal power supply voltage VDD_RAM to SRAM memory cell 32 is necessary for data retention. On the other hand, if external regulator 3 is used to generate internal power supply voltage VDD_RAM, power consumption is large. Therefore, external regulator 3 is turned off and internal regulator 26 is turned on to generate internal power supply voltage VDD_RAM.

At this time, system control circuit 28 outputs control signal pswon rendered inactive to the H level to level shifter 16. PMOS switch 400 is turned off by receiving level-shifted control signal pswon, and thus, VDD line 15 is electrically disconnected from VDD_RAM line 35. System control circuit 28 further outputs control signal pd_stby rendered active to the L level to internal regulator 26. When error amplifier 260 is turned on by receiving L-level control signal pd_stby, internal regulator 26 generates internal power supply voltage VDD_RAM. As a result, VDD_RAM line 35 is supplied with internal power supply voltage VDD_RAM from internal regulator 26. As described above, in the standby mode, SRAM memory cell 32 is driven by internal power supply voltage VDD_RAM supplied from internal regulator 26.

(1) Occurrence of Voltage Drop in VDD_RAM Line

As described above, in semiconductor device 1000 according to the related art, the two regulators (external regulator 3 and internal regulator 26) having different current supply capabilities are switched and used based on whether semiconductor device 1000 is in the active mode or in the standby mode, thereby achieving lower power consumption.

Generally, however, in internal regulator 26, it is desirable to reduce power consumption as much as possible, and thus, response of the output voltage is slow as compared with external regulator 3. Therefore, when semiconductor device 1000 shifts from the active mode to the standby mode, a time difference occurs between the time when internal regulator 26 is turned on and the time when the voltage is supplied to VDD_RAM line 35. As a result, there is a problem that so-called voltage drop, in which the voltage of VDD_RAM line 35 decreases temporarily, occurs immediately after the shift to the standby mode.

Figure 10:
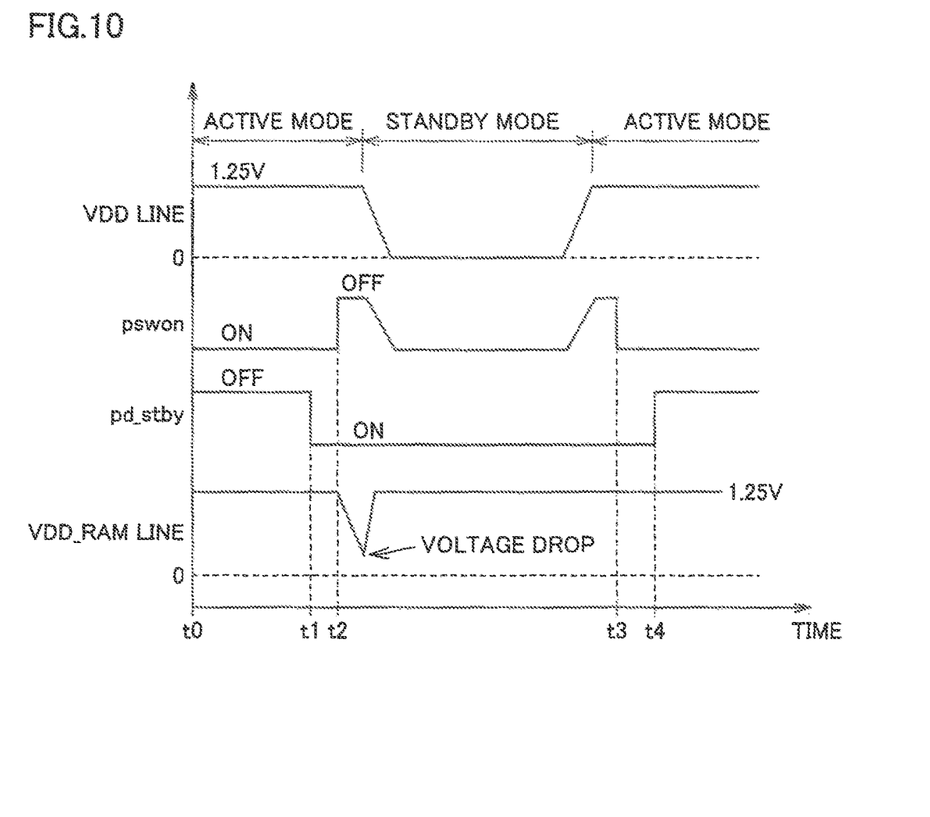
FIG. 10 is a timing chart for describing the operation of switching between an external regulator and an internal regulator in the semiconductor device according to the related art.

FIG. 10 is a timing chart for describing the operation of switching between external regulator 3 and internal regulator 26 in semiconductor device 1000 according to the related art.

Referring to FIG. 10, when semiconductor device 1000 is in the active mode (time t0), internal power supply voltage VDD (1.25 V) is supplied from external regulator 3 to VDD line 15. PMOS switch 400 is turned on in accordance with control signal pswon rendered active to the L level. On the other hand, internal regulator 26 is turned off in accordance with control signal pd_stby rendered inactive to the H level. VDD line 15 is connected to VDD_RAM line 35 by PMOS switch 400, and thereby, internal power supply voltage VDD is supplied to VDD_RAM line 35.

When semiconductor device 1000 shifts from the active mode to the standby mode, control signal pd_stby is rendered active to the L level and internal regulator 26 is turned on (time t1). Then, control signal pswon is rendered inactive to the H level and PMOS switch 400 is turned off (time t2). Since external regulator 3 is turned off in the standby mode, the voltage of VDD line 15 decreases from internal power supply voltage VDD (1.25 V) toward a ground voltage (0 V).

If a timing at which internal power supply voltage VDD_RAM is supplied from internal regulator 26 to VDD_RAM line 35 is later than a timing at which PMOS switch 400 is turned off (time t2), power supply to VDD_RAM line 35 is interrupted temporarily. Therefore, voltage drop occurs in VDD_RAM line 35 as shown in FIG. 10.

When semiconductor device 1000 returns from the standby mode to the active mode, control signal pswon is rendered active to the L level and PMOS switch 400 is turned on (time t3). In addition, control signal pd_stby is rendered inactive to the H level and internal regulator 26 is turned off. Since external regulator 3 is turned on in the active mode, the voltage of VDD line 15 increases again from the ground voltage (0 V) to internal power supply voltage VDD (1.25 V). Since the responsiveness of external regulator 3 is good, voltage drop does not occur in VDD_RAM line 35.

As described above, the voltage drop in VDD_RAM line 35 immediately after the shift to the standby mode is caused by the responsiveness of internal regulator 26, and thus, it is also conceivable to maintain internal regulator 26 in the ON state constantly to suppress the voltage drop. However, if internal regulator 26 is maintained in the ON state in the active mode in the structure shown in FIG. 9, internal regulator 26 may consume the power wastefully when a voltage difference occurs between internal power supply voltage VDD_RAM supplied from internal regulator 26 and internal power supply voltage VDD supplied from external regulator 3.

When internal power supply voltage VDD is 1.15 V and internal power supply voltage VDD_RAM is 1.35 V, for example, a current continues to flow from internal regulator 26 toward external regulator 3 up to the limit of current that can be supplied by internal regulator 26. As a result, the power is consumed wastefully and electromigration occurs easily in VDD line 15 and VDD_RAM line 35, which affects the reliability of the semiconductor device. Therefore, maintaining internal regulator 26 in the ON state constantly is not realistic.

(2) Restrictions in Power Supply Startup Sequence

Figure 11:
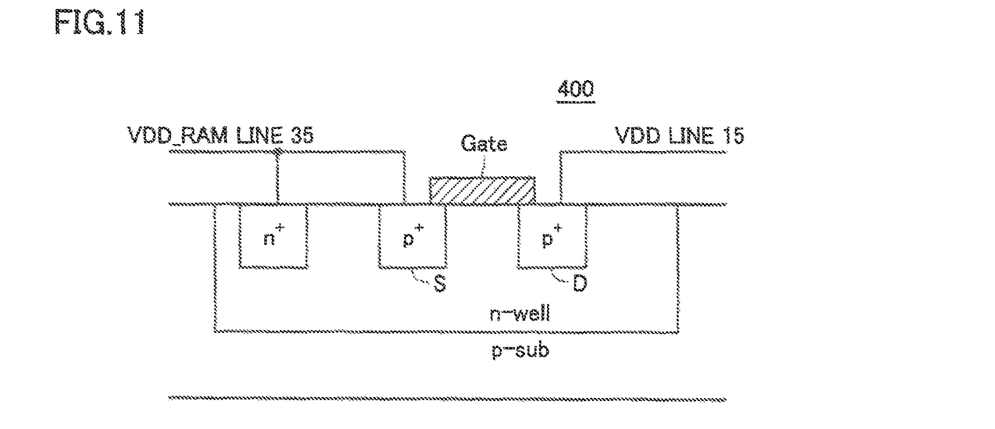
FIG. 11 is a cross-sectional view schematically showing a structure of a common PMOS switch.

As shown in FIG. 9, VDD line 15 is connected to VDD_RAM line 35 by PMOS switch 400. FIG. 11 is a cross-sectional view schematically showing a structure of a common PMOS switch.

Referring to FIG. 11, PMOS switch 400 is formed by a PMOS transistor. The PMOS transistor is formed in an N-type well n-well provided in a P-type semiconductor substrate p-sub. The PMOS transistor has a drain D connected to VDD line 15 and a source S connected to VDD_RAM line 35. N-type well n-well is connected to VDD_RAM line 35. The power is supplied to VDD_RAM line 35 both in the active mode and in the standby mode, whereas supply of the power to VDD line 15 is stopped in the standby mode.

When semiconductor device 1000 is powered on, external regulator 3 and internal power supply circuit 210 are started, respectively, and thereby, internal power supply voltages VDD and VDD_RAM rise, respectively. The PMOS transistor receives internal power supply voltage VDD at drain D and receives internal power supply voltage VDD_RAM at source S and N-type well n-well.

Assume, for example, that a rising edge of internal power supply voltage VDD_RAM is later than a rising edge of internal power supply voltage VDD. In this case, a voltage of N-type well n-well becomes lower than a voltage of drain D, and thus, a PN junction between drain D and N-type well n-well is biased in the forward direction. Therefore, a current may flow through the PN junction.

On the other hand, when the rising edge of internal power supply voltage VDD is later than the rising edge of internal power supply voltage VDD_RAM, the voltage of N-type well n-well becomes higher than the voltage of drain D. Therefore, the PN junction between drain D and N-type well n-well is not biased in the forward direction and the current does not flow through the PN junction.

Therefore, when semiconductor device 1000 is powered on, there are restrictions that internal power supply voltage VDD_RAM must be raised prior to internal power supply voltage VDD.

As described above, the power supply control in semiconductor device 1000 according to the related art had problems of the voltage drop in VDD_RAM line 35 immediately after the shift to the standby mode and the restrictions in the power supply startup sequence. As described below, in the first embodiment, internal regulator 26 is allowed to be maintained in the ON state constantly, thereby suppressing the voltage drop immediately after the shift to the standby mode. In addition, PMOS switch 400 is configured to be capable of preventing the PN junction from being biased in the forward direction when power is turned on, thereby achieving the freed power supply startup sequence.

[Power Supply Control in Semiconductor Device According to First Embodiment]

Power supply control in the semiconductor device according to the first embodiment will be described hereinafter.

Figure 1:
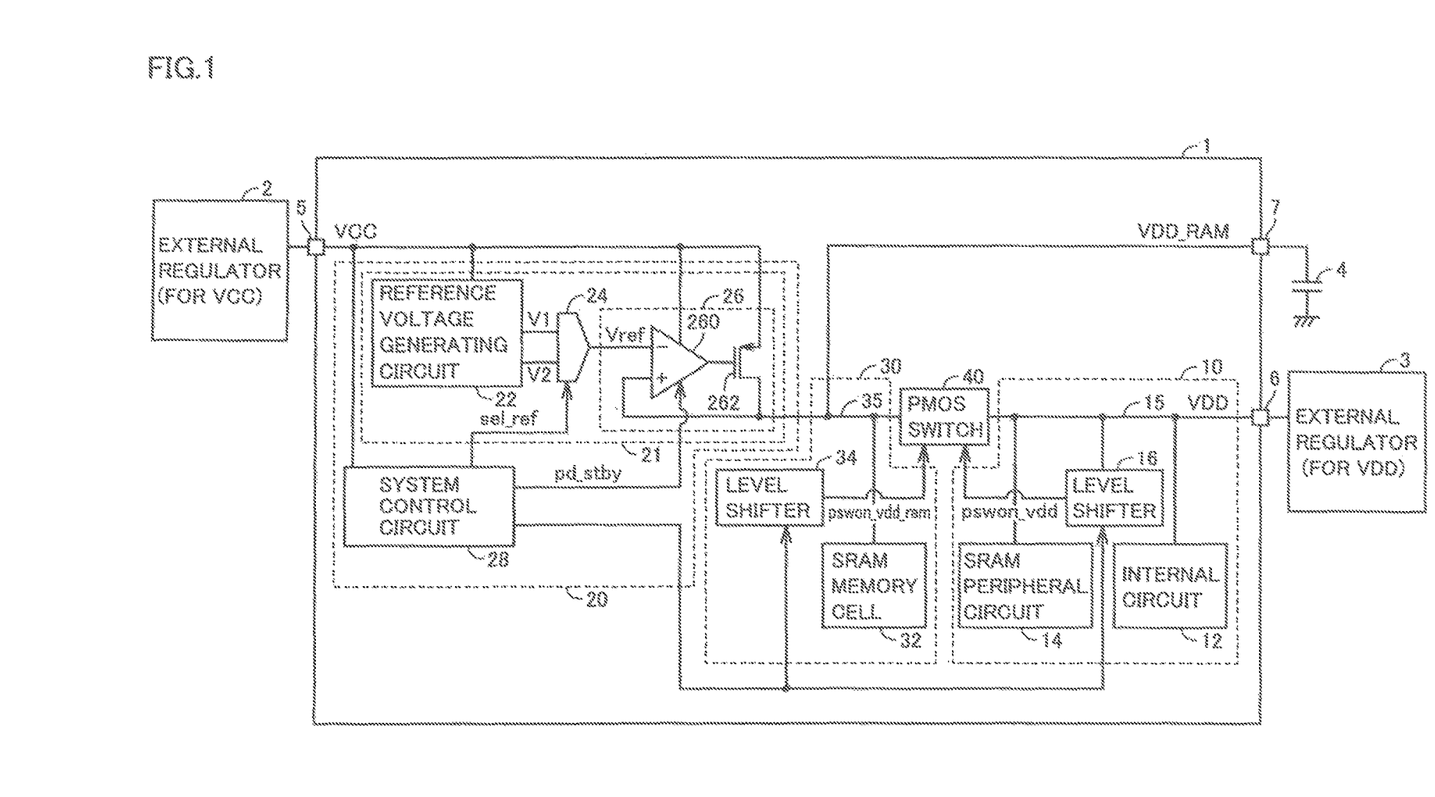
FIG. 1 is a circuit diagram showing a structure of a semiconductor device according to a first embodiment.

FIG. 1 is a circuit diagram showing a structure of the semiconductor device according to the first embodiment.

Referring to FIG. 1, semiconductor device 1 according to the first embodiment is different from semiconductor device 1000 according to the related art shown in FIG. 9 in that an internal power supply circuit 21 is provided instead of internal power supply circuit 210. In addition, a PMOS switch 40 and a level shifter 34 are provided instead of PMOS switch 400. The overall structure of semiconductor device 1 is similar to that of semiconductor device 1000 shown in FIG. 9 except for internal power supply circuit 21, PMOS switch 40 and level shifter 34, and thus, detailed description will not be repeated.

(Structure of Internal Power Supply Circuit 21)

Internal power supply circuit 21 operates by external power supply voltage VCC. Internal power supply circuit 21 includes a reference voltage generating circuit 22, a selector 24 and internal regulator 26.

Reference voltage generating circuit 22 generates reference voltage Vref obtained by stepping down external power supply voltage VCC. Reference voltage generating circuit 22 is configured to be capable of generating two reference voltages V1 and V2 having different voltage levels. Reference voltage V1 is set at, for example, approximately 1.05 V and reference voltage V2 is set at, for example, approximately 1.25 V.

In accordance with a control signal sel_ref provided from system control circuit 28, selector 24 selects one of voltages V1 and V2 outputted by reference voltage generating circuit 22. Selector 24 outputs the selected voltage to internal regulator 26 as reference voltage Vref.

Internal regulator 26 generates internal power supply voltage VDD_RAM by referring to reference voltage Vref inputted from selector 24. Specifically, internal regulator 26 includes error amplifier 260 and PMOS transistor 262, and receives reference voltage Vref at the inverting input terminal of error amplifier 260. Internal regulator 26 receives the feedback voltage from the output terminal of internal regulator 26 at the non-inverting input terminal of error amplifier 260.

As described with reference to FIG. 9, error amplifier 260 generates the control voltage in accordance with the voltage difference between reference voltage Vref and the feedback voltage, and supplies the generated control voltage to the control terminal (gate terminal) of PMOS transistor 262. As a result, the output voltage equal to reference voltage Vref is supplied to VDD_RAM line 35 as internal power supply voltage VDD_RAM. As described above, reference voltage Vref is switched between the two values of V1 (1.05 V) and V2 (1.25 V) in accordance with control signal sel_ref, and thereby, internal power supply voltage VDD_RAM is switched between these two values of V1 and V2.

Error amplifier 260 is controlled into the ON state or the OFF state in accordance with control signal pd_stby provided from system control circuit 28. Specifically, error amplifier 260 enters the ON state by receiving control signal pd_stby rendered active to the L level, and enters the OFF state by receiving control signal pd_stby rendered inactive to the H level.

PMOS switch 40 is connected between VDD line 15 and VDD_RAM line 35. PMOS switch 40 receives a control signal pswon_vdd generated by system control circuit 28 and level-shifted by level shifter 16. PMOS switch 40 further receives a control signal pswon_vdd_ram generated by system control circuit 28 and level-shifted by level shifter 34. As described below, ON/OFF of PMOS switch 40 is controlled in response to these two control signals.

Specifically, when control signals pswon_vdd and pswon_vdd_ram are both rendered active to the L level, PMOS switch 40 is turned on. As a result, VDD line 15 is electrically connected to VDD_RAM line 35. On the other hand, when at least one of control signals pswon_vdd and pswon_vdd_ram is rendered inactive to the H level, PMOS switch 40 is turned off. As a result, VDD line 15 is electrically disconnected from VDD_RAM line 35.

As shown in FIG. 1, semiconductor device 1 is divided into a VDD power supply region 10, a VCC power supply region 20 and a VDD_RAM power supply region 30. VDD power supply region 10 includes internal circuit 12, SRAM peripheral circuit 14 and level shifter 16. VCC power supply region 20 includes internal power supply circuit 21 and system control circuit 28. VDD_RAM power supply region 30 includes SRAM memory cell 32 and level shifter 34.

A high-breakdown-voltage transistor having a large film thickness is mainly used in the circuits included in VCC power supply region 20. On the other hand, a low-breakdown-voltage transistor having a film thickness smaller than that of the high-breakdown-voltage transistor is mainly used in the circuits included in VDD power supply region 10 and VDD_RAM power supply region 30.

Similarly to semiconductor device 1000 according to the related art (FIG. 9), semiconductor device 1 according to the first embodiment has the active mode and the standby mode as the operation modes. System control circuit 28 switches the sources of the internal power supply voltages based on whether semiconductor device 1 is in the active mode or in the standby mode.

If, in the structure according to the related art, the two regulators (external regulator 3 and internal regulator 26) having different current supply capabilities are switched and used based on whether the semiconductor device is in the active mode or in the standby mode as described above, voltage drop occurs in VDD_RAM line 35 immediately after the shift to the standby mode due to the responsiveness of internal regulator 26 (refer to FIG. 10).

Therefore, in semiconductor device 1 according to the first embodiment, the voltage level of internal power supply voltage VDD_RAM generated by internal power supply circuit 21 is switched in accordance with the operation mode of semiconductor device 1. As a result, wasteful power consumption caused by the voltage difference between internal power supply voltages VDD and VDD_RAM is suppressed and internal power supply circuit 21 can be maintained in the ON state constantly.

Figure 2:
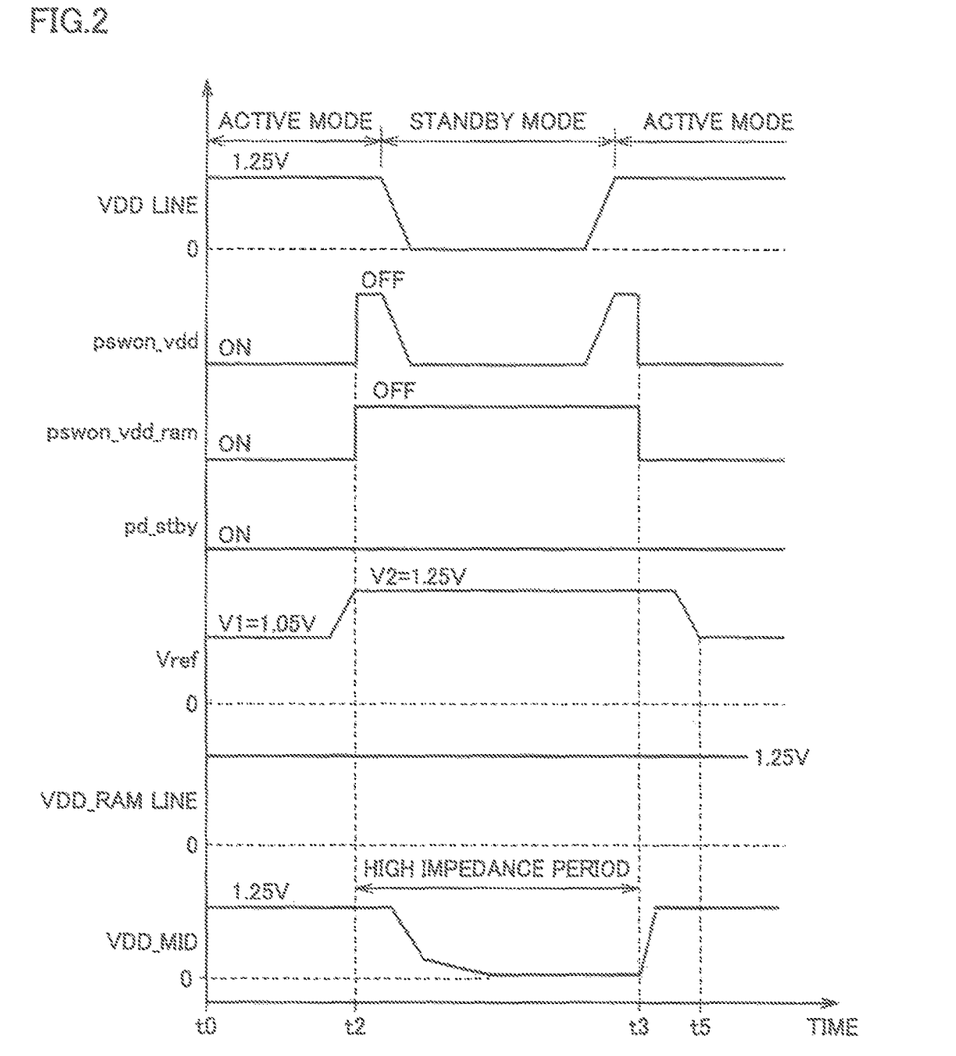
FIG. 2 is a timing chart for describing the operation of switching internal power supply voltages in the semiconductor device according to the first embodiment.

FIG. 2 is a timing chart for describing the operation of switching internal power supply voltage VDD_RAM in semiconductor device 1 according to the first embodiment.

Referring to FIG. 2, when semiconductor device 1 is in the active mode (time t0), internal power supply voltage VDD (1.25 V) is supplied from external regulator 3 to VDD line 15. PMOS switch 40 is turned on in accordance with control signals pswon_vdd and pswon_vdd_ram rendered active to the L level. VDD_RAM line 35 is electrically connected to VDD line 15 by PMOS switch 40, and thus, internal power supply voltage VDD is supplied from VDD line 15.

At this time, in internal power supply circuit 21, internal regulator 26 is turned on in accordance with control signal pd_stby rendered active to the L level. As a result, internal power supply voltage VDD_RAM is supplied from internal regulator 26 to VDD_RAM line 35.

As described above, when internal power supply voltage VDD_RAM is higher than internal power supply voltage VDD, the current continues to flow from internal regulator 26 toward external regulator 3 up to the limit of current that can be supplied by internal regulator 26.

Thus, in the first embodiment, reference voltage Vref provided to internal regulator 26 in the active mode is set at voltage V1 (1.05 V) that is lower than internal power supply voltage VDD (1.25 V). Specifically, selector 24 selects voltage V1 in accordance with control signal sel_ref from system control circuit 28 and outputs voltage V1 to internal regulator 26. Internal regulator 26 operates by voltage V1 as reference voltage Vref, and thereby, internal power supply voltage VDD_RAM equal to voltage V1 is supplied to VDD_RAM line 35. Voltage V1 is set to be lower than the lower limit value of internal power supply voltage VDD, in consideration of variations in internal power supply voltage VDD.

As described above, internal power supply voltage VDD_RAM (1.05 V) generated by internal regulator 26 in the active mode is set to be lower than internal power supply voltage VDD (1.25 V), and thereby, the current flowing from internal regulator 26 toward external regulator 3 can be prevented. As a result, wasteful power consumption in internal regulator 26 is suppressed, and thus, internal regulator 26 can be maintained in the ON state constantly.

When semiconductor device 1 shifts from the active mode to the standby mode, selector 24 selects voltage V2 (1.25 V) in accordance with control signal sel_ref from system control circuit 28 and outputs voltage V2 to internal regulator 26. Internal regulator 26 operates by voltage V2 as reference voltage Vref, and thereby, internal power supply voltage VDD_RAM equal to voltage V2 is supplied to VDD_RAM line 35.

In the description above, the structure in which voltage V2 is set to have the same voltage level as that of internal power supply voltage VDD (1.25 V) has been illustrated by way of example. However, voltage V2 may have any voltage level (e.g., approximately 1.1 V) as long as data retention in SRAM memory cell 32 is possible.

System control circuit 28 renders control signals pswon_vdd and pswon_vdd_ram inactive to the H level, and turns off PMOS switch 40 (time t2). Since external regulator 3 is turned off in the standby mode, the voltage of VDD line 15 decreases from internal power supply voltage VDD (1.25V) toward the ground voltage (0 V). On the other hand, since internal regulator 26 is already ON, occurrence of voltage drop in VDD_RAM line 35 is suppressed.

(Structure of PMOS Switch 40)

Figure 3:
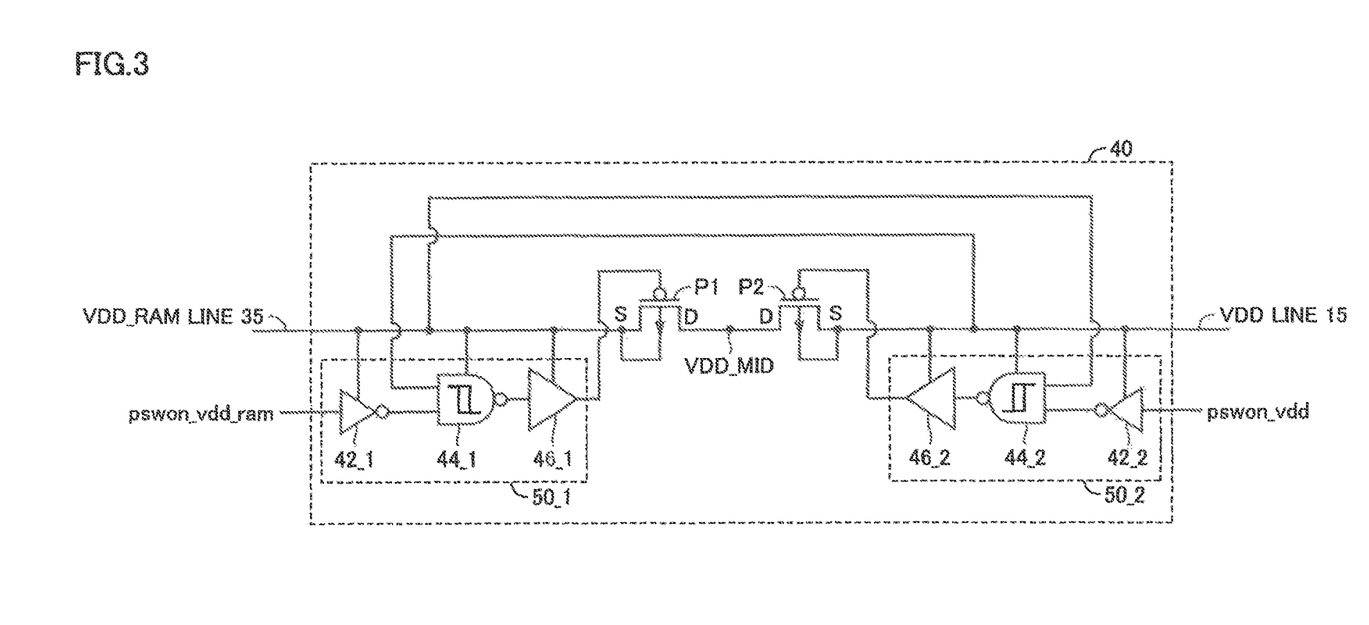
FIG. 3 is a circuit diagram showing a structure of a PMOS switch in FIG. 1.

FIG. 3 is a circuit diagram showing a structure of PMOS switch 40 in FIG. 1.

Referring to FIG. 3, PMOS switch 40 includes two serially connected PMOS transistors P1 and P2, and two control signal generating units 50_1 and 50_2.

PMOS transistors P1 and P2 are serially connected between VDD_RAM line 35 and VDD line 15. PMOS transistor P1 has a source S connected to VDD_RAM line 35 and a drain D connected to a drain of PMOS transistor P2. PMOS transistor P2 has a source S connected to VDD line 15. In the following description, a connection node connecting PMOS transistors P1 and P2 will be expressed as "intermediate node VDD_MID".

Control signal generating unit 50_1 generates a control signal for controlling ON/OFF of PMOS transistor P1. Control signal generating unit 50_1 includes an inverter 42_1, a NAND gate 44_1 and a buffer 46_1. Inverter 42_1, NAND gate 44_1 and buffer 46_1 operate by internal power supply voltage VDD_RAM. Buffer 46_1 is often formed by a two-stage inverter.

Inverter 42_1 outputs, to one input node of NAND gate 44_1, an inverted signal of control signal pswon_vdd_ram provided from system control circuit 28 (FIG. 1). The other input node of NAND gate 44_1 is connected to VDD line 15. NAND gate 44_1 outputs, to buffer 46_1, a signal obtained by inverting a logical product between the inverted signal of control signal pswon_vdd_ram and internal power supply voltage VDD supplied to VDD line 15. Buffer 46_1 outputs a control signal corresponding to the output signal of NAND gate 44_1 to a control terminal (gate terminal) of PMOS transistor P1.

Control signal generating unit 50_2 generates a control signal for controlling ON/OFF of PMOS transistor P2. Control signal generating unit 50_2 includes an inverter 42_2, a NAND gate 44_2 and a buffer 46_2. Inverter 42_2, NAND gate 44_2 and buffer 46_2 operate by internal power supply voltage VDD. Buffer 46_2 is often formed by a two-stage inverter.

Inverter 42_2 outputs, to one input node of NAND gate 44_2, an inverted signal of control signal pswon_vdd provided from system control circuit 28 (FIG. 1). The other input node of NAND gate 44_2 is connected to VDD_RAM line 35. NAND gate 44_2 outputs, to buffer 46_2, a signal obtained by inverting a logical product between the inverted signal of control signal pswon_vdd and internal power supply voltage VDD_RAM supplied to VDD_RAM line 35. Buffer 46_2 outputs a control signal corresponding to the output signal of NAND gate 44_2 to a control terminal (gate terminal) of PMOS transistor P2.

Now, attention is focused on PMOS transistor P1 and control signal generating unit 50_1 thereof.

Control signal pswon_vdd_ram inputted to control signal generating unit 50_1 is rendered active to the L level when PMOS transistor P1 is turned on, and is rendered inactive to the H level when PMOS transistor P1 is turned off. NAND gate 44_1 outputs the signal obtained by inverting the logical product between the inverted signal of control signal pswon_vdd_ram and internal power supply voltage VDD.

Specifically, when internal power supply voltage VDD is in the H level (e.g., 1.25 V), NAND gate 44_1 functions as an inverter, and inverts the logic of the inverted signal of control signal pswon_vdd_ram and outputs the signal. Therefore, PMOS transistor P1 is turned on when control signal pswon_vdd_ram is in the L level, and is turned off when control signal pswon_vdd_ram is in the H level.

On the other hand, when internal power supply voltage VDD is in the L level (0 V), NAND gate 44_1 outputs the H-level signal, regardless of the logic of control signal pswon_vdd_ram. Therefore, PMOS transistor P1 is turned off, regardless of the logic of control signal pswon_vdd_ram.

As described above, ON/OFF of PMOS transistor P1 can be controlled only when internal power supply voltage VDD rises to the H level. Similarly, in PMOS transistor P2 and control signal generating unit 50_2 thereof as well, ON/OFF of PMOS transistor P2 can be controlled only when internal power supply voltage VDD_RAM rises to the H level. In other words, ON/OFF of PMOS switch 40 is controlled in accordance with control signals pswon_vdd and pswon_vdd_ram, in the state where both of internal power supply voltages VDD and VDD_RAM have risen to the H level.

Since semiconductor device 1 according to the first embodiment is configured as described above, the current does not flow through the PN junction between drain D of each PMOS transistor and N-type well n-well in semiconductor device 1 according to the first embodiment even when a time difference occurs between the rising edge of internal power supply voltage VDD_RAM and the rising edge of internal power supply voltage VDD. As a result, the power supply startup sequence can be freed. The reason for this will be described below.

Figure 4:
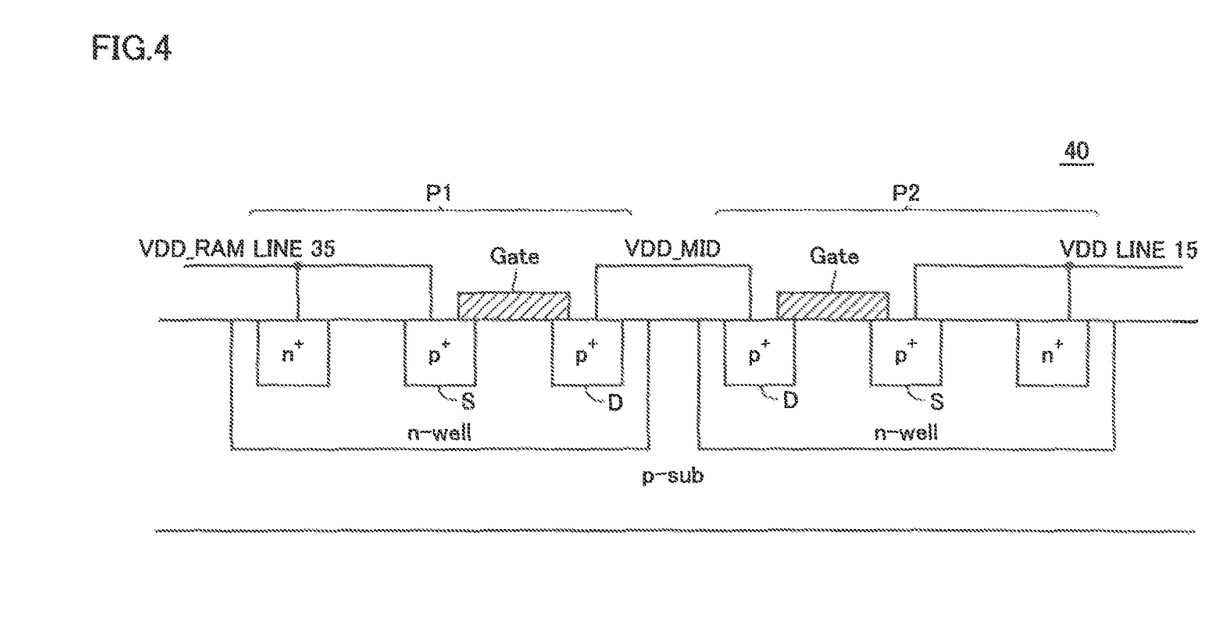
FIG. 4 is a cross-sectional view schematically showing the structure of the PMOS switch.

FIG. 4 is a cross-sectional view schematically showing the structure of PMOS switch 40.

Referring to FIG. 4, PMOS transistors P1 and P2 are formed in N-type well n-well provided in p-type semiconductor substrate p-sub. PMOS transistor P1 has a source S connected to VDD_RAM line 35 and a drain D connected to a drain D of PMOS transistor P2 at intermediate node VDD_MID. N-type well n-well having PMOS transistor P1 formed therein is connected to VDD_RAM line 35.

PMOS transistor P2 has a source S connected to VDD line 15 and drain D connected to drain D of PMOS transistor P1 at intermediate node VDD_MID. N-type well n-well having PMOS transistor P2 formed therein is connected to VDD line 15.

When semiconductor device 1 is powered on, external regulator 3 and internal power supply circuit 21 are started up, respectively, and thereby, internal power supply voltages VDD and VDD_RAM rise, respectively. PMOS transistor P1 receives internal power supply voltage VDD_RAM at source S and N-type well n-well. PMOS transistor P2 receives internal power supply voltage VDD at source S and N-type well n-well.

Now, assume that the rising edge of internal power supply voltage VDD_RAM is later than the rising edge of internal power supply voltage VDD. In this case, as for PMOS transistor P2, PMOS transistor P2 is not turned on until internal power supply voltage VDD_RAM rises to the H level, even when internal power supply voltage VDD is in the H level, as described above. Therefore, drain D of PMOS transistor P2 and intermediate node VDD_MID enter a high impedance state.

On the other hand, as for PMOS transistor P1, PMOS transistor P1 is not turned on because control signal generating unit 50_1 is not turned on until internal power supply voltage VDD_RAM rises to the H level, even when internal power supply voltage VDD is in the H level. Even in this state, drain D of PMOS transistor P1 connected to intermediate node VDD_MID is in the high impedance state, and thus, the PN junction between drain D and corresponding N-type well n-well is not biased in the forward direction. Therefore, the current does not flow through the PN junction.

The same is applied as well to the case in which the rising edge of internal power supply voltage VDD is later than the rising edge of internal power supply voltage VDD_RAM. In this case, in PMOS transistor P2, the PN junction between drain D and corresponding N-type well n-well is not biased in the forward direction, and thus, the current does not flow through the PN junction.

As described above, whether internal power supply voltage VDD rises to the H level prior to internal power supply voltage VDD_RAM or internal power supply voltage VDD_RAM rises to the H level prior to internal power supply voltage VDD, the PN junction in PMOS transistors P1 and P2 is not biased in the forward direction. Therefore, the restrictions in the power supply startup sequence become unnecessary, and thus, the power supply startup sequence can be freed.

Semiconductor device 1 according to the first embodiment is configured such that the voltage level of internal power supply voltage VDD_RAM generated by internal power supply circuit 21 is switched in accordance with the operation mode of semiconductor device 1. However, as described in the related art, PMOS switch 40 shown in FIG. 4 is also applicable to the structure in which the two regulators (external regulator 3 and internal regulator 26) having different current supply capabilities are switched and used based on whether the semiconductor device is in the active mode or in the standby mode. In such structure as well, the need for the restrictions in the power supply startup sequence can be eliminated.

Furthermore, in semiconductor device 1 according to the first embodiment, the switch transistors between VDD_RAM line 35 and VDD line 15 can be formed by PMOS transistors P1 and P2 that are not high-breakdown-voltage transistors but low-breakdown-voltage transistors. As a result, the area (transistor size L/W) can be reduced as compared with the case in which the switch transistors are formed by high-breakdown-voltage transistors.

Second Embodiment

In semiconductor device 1 according to the first embodiment described above, description has been given to the structure in which reference voltage generating circuit 22 capable of generating two reference voltages V1 and V2 having different voltage levels is used as the structure for switching internal power supply voltage VDD_RAM generated by internal power supply circuit 21 in accordance with the operation mode. However, the reference voltage may be maintained in one voltage level and internal power supply voltage VDD_RAM may be switched between two values V1 and V2 on the internal regulator 26 side. In a second embodiment, description will be given to a structure in which internal power supply voltage VDD_RAM is switched by internal regulator 26.

Figure 5:
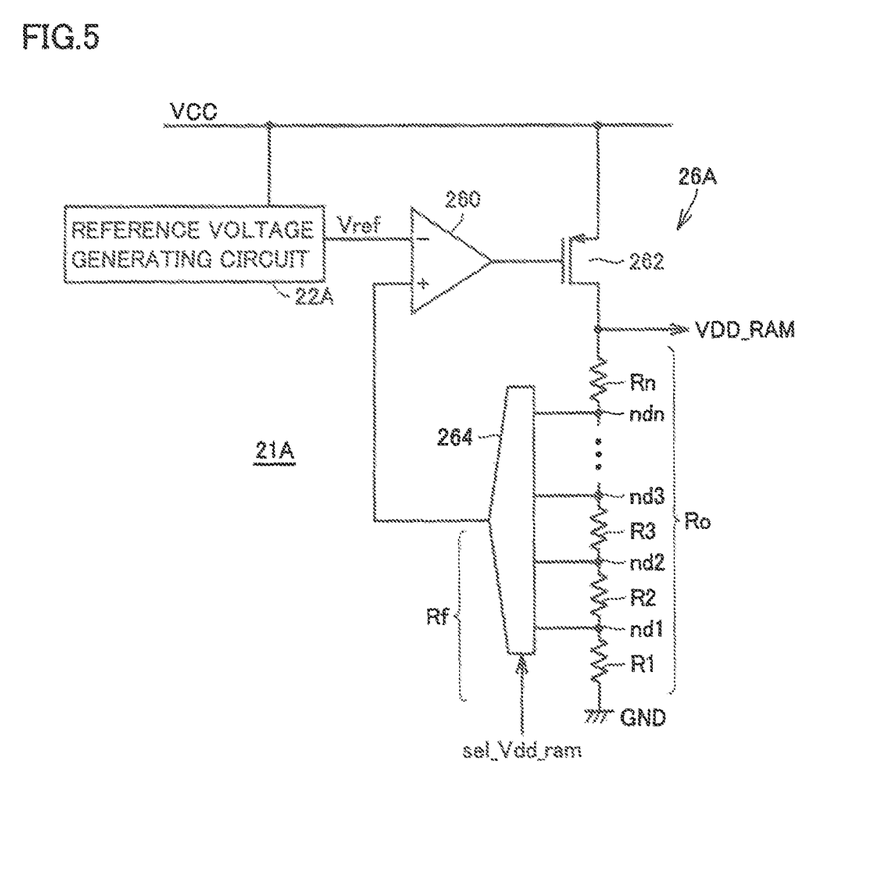
FIG. 5 is a circuit diagram showing a structure of an internal power supply circuit applied to a semiconductor device according to a second embodiment.

FIG. 5 is a circuit diagram showing a structure of an internal power supply circuit 21A applied to a semiconductor device according to the second embodiment. The structure of the semiconductor device according to the second embodiment is similar to that of the semiconductor device shown in FIG. 1 except for internal power supply circuit 21A, and thus, detailed description will not be repeated.

Referring to FIG. 5, internal power supply circuit 21A of the second embodiment includes a reference voltage generating circuit 22A and an internal regulator 26A.

Internal power supply circuit 21A operates by external power supply voltage VCC. Internal power supply circuit 21A includes reference voltage generating circuit 22A and internal regulator 26A. Reference voltage generating circuit 22A generates reference voltage Vref obtained by stepping down external power supply voltage VCC.

Internal regulator 26A generates internal power supply voltage VDD_RAM by referring to reference voltage Vref. Specifically, internal regulator 26A includes error amplifier 260, PMOS transistor 262, n (n is a natural number equal to or larger than two) resistive elements R1 to Rn, and a selector 264.

Error amplifier 260 has the inverting input terminal (−terminal) connected to an output node of reference voltage generating circuit 22A, the non-inverting input terminal (+terminal) connected to an output node of selector 264, and an output node connected to the control terminal (gate terminal) of PMOS transistor 262.

Resistive elements R1 to Rn are serially connected in this order between a drain of PMOS transistor 262 and a ground node. Selector 264 outputs, to the non-inverting input terminal of error amplifier 260, a voltage of a node (hereinafter referred to as "selected node") selected by a control signal sel_vdd_ram from system control circuit 28 (FIG. 1), of connection nodes nd1 to ndn of resistive elements R1 to Rn.

Assume that in internal regulator 26A, Rf represents a resistance value between the selected node and the ground node, and Ro represents a combined resistance value of serially connected resistive elements R1 to Rn. Then, a voltage of the output node (internal power supply voltage VDD_RAM) is Ro/Rf times as high as an input voltage (reference voltage Vref) to the inverting input terminal of error amplifier 260. Since resistance value Rf can be adjusted by control signal sel_vdd_ram, internal power supply voltage VDD_RAM can be adjusted with a high degree of accuracy.

System control circuit 28 switches resistance value Rf based on whether the semiconductor device is in the active mode or in the standby mode. Specifically, in the active mode, system control circuit 28 adjusts resistance value Rf such that internal power supply voltage VDD_RAM is set to be lower (e.g., 1.05 V) than internal power supply voltage VDD (1.25 V). As a result, the current flowing from internal regulator 26 toward external regulator 3 can be prevented.

On the other hand, in the standby mode, system control circuit 28 adjusts resistance value Rf such that internal power supply voltage VDD_RAM is set at a voltage (e.g., 1.1 V) that allows data retention in SRAM memory cell 32.

As described above, according to the second embodiment, internal regulator 26A is configured to be capable of switching the output voltage (internal power supply voltage VDD_RAM) in accordance with the operation mode of the semiconductor device, and thus, there can be obtained an effect similar to that in the aforementioned first embodiment.

Third Embodiment

In semiconductor device 1 according to the first embodiment described above, description has been given to the structure in which disconnection of VDD line 15 from VDD_RAM line 35 is performed by one PMOS switch 40 formed by the two PMOS transistors. However, a plurality of PMOS switches connected in parallel may be turned off with a time difference. In a third embodiment, description will be given to a structure in which disconnection of VDD line 15 from VDD_RAM line 35 is performed by a plurality of PMOS switches.

Figure 6:
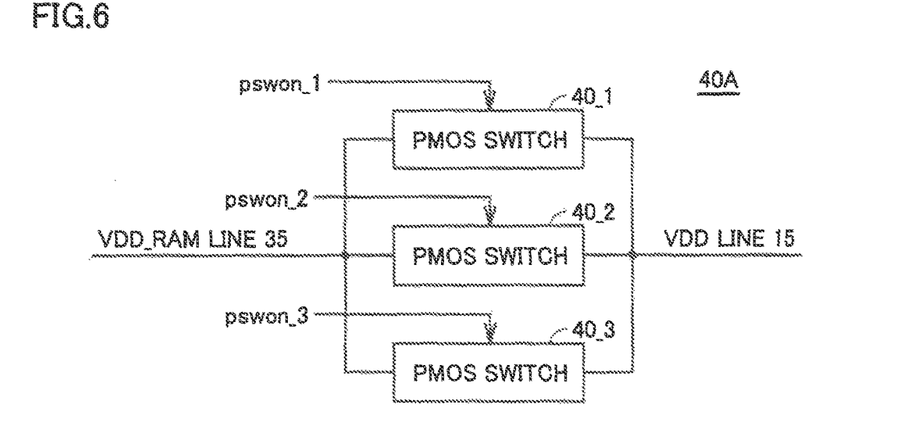
FIG. 6 is a circuit diagram showing one example of a structure of a PMOS switch applied to a semiconductor device according to a third embodiment.

FIG. 6 is a circuit diagram showing one example of a structure of a PMOS switch circuit 40A applied to a semiconductor device according to the third embodiment. The structure of the semiconductor device according to the third embodiment is similar to that of the semiconductor device shown in FIG. 1 except for PMOS switch circuit 40A, and thus, detailed description will not be repeated.

Referring to FIG. 6, PMOS switch circuit 40A of the third embodiment includes a plurality of (e.g., three) PMOS switches 40_1, 40_2 and 40_3 connected in parallel between VDD line 15 and VDD_RAM line 35. A circuit structure of each of PMOS switches 40_1, 40_2 and 40_3 is similar to that of PMOS switch 40 shown in FIG. 3, and thus, detailed description will not be repeated.

ON/OFF of PMOS switch 40_1 is controlled in accordance with a control signal pswon_1 provided from system control circuit 28. Although not shown, control signal pswon_1 includes a control signal pswon_vdd_ram for controlling ON/OFF of PMOS transistor P1 forming PMOS switch 40_1, and a control signal pswon_vdd for controlling ON/OFF of PMOS transistor P2.

Similarly, ON/OFF of PMOS switch 40_2 is controlled in accordance with a control signal pswon_2 provided from system control circuit 28. ON/OFF of PMOS switch 40_3 is controlled in accordance with pswon_2. ON/OFF of PMOS switch 40_3 is controlled in accordance with a control signal pswon_3 provided from system control circuit 28.

In the semiconductor device according to the third embodiment, when the semiconductor device shifts from the active mode to the standby mode, PMOS switches 40_1, 40_2 and 40_3 connected in parallel are turned off with a time difference. The function and effect of the semiconductor device according to the third embodiment will be described with reference to a comparative example shown in FIG. 7.

Figure 7:
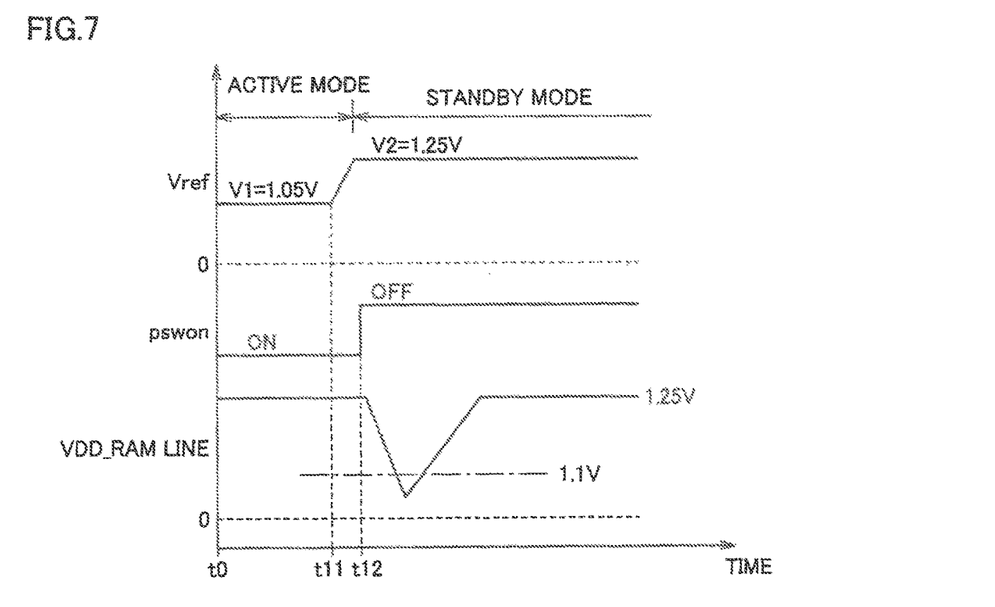
FIG. 7 is a timing chart showing the operation of the semiconductor device according to the first embodiment.

FIG. 7 is a timing chart showing the operation of semiconductor device 1 (FIG. 1) according to the first embodiment. FIG. 7 shows temporal changes in reference voltage Vref, control signal pswon and VDD_RAM line 35 when the semiconductor device shifts from the active mode to the standby mode.

Referring to FIG. 7, when semiconductor device 1 is in the active mode (time t0), PMOS switch 40 is turned on in accordance with control signal pswon (pswon_vdd, pswon_vdd_ram) rendered active to the L level. VDD_RAM line 35 is electrically connected to VDD line 15 by PMOS switch 40, and thus, VDD_RAM line 35 is supplied with internal power supply voltage VDD (1.25 V) from VDD line 15.

At this time, in internal power supply circuit 21, reference voltage Vref provided from reference voltage generating circuit 22 to internal regulator 26 is set at voltage V1 (1.05 V) lower than internal power supply voltage VDD (1.25 V). Internal regulator 26 operates by voltage V1 as reference voltage Vref, and thereby, internal power supply voltage VDD_RAM equal to voltage V1 is supplied to VDD_RAM line 35.

When semiconductor device 1 shifts from the active mode to the standby mode, internal power supply circuit 21 switches reference voltage Vref provided from reference voltage generating circuit 22 to internal regulator 26, from voltage V1 (1.05 V) to voltage V2 (1.25 V) (time t11). Then, control signal pswon is rendered inactive to the H level and PMOS switch 40 is turned off (time t12).

Internal regulator 26 operates by voltage V2 as reference voltage Vref, and thereby, internal power supply voltage VDD_RAM equal to voltage V2 is supplied to VDD_RAM line 35. However, as described above, response of the output voltage of internal regulator 26 is slow. Therefore, there may arise a situation that internal power supply voltage VDD_RAM does not still reach voltage V2 when PMOS switch 40 is turned on (time t12). When such a situation occurs, voltage drop may occur in VDD_RAM line 35 and internal power supply voltage VDD_RAM may become lower than the voltage (e.g., 1.1 V) that allows data retention in SRAM memory cell 32, as shown in FIG. 7.

Figure 8:
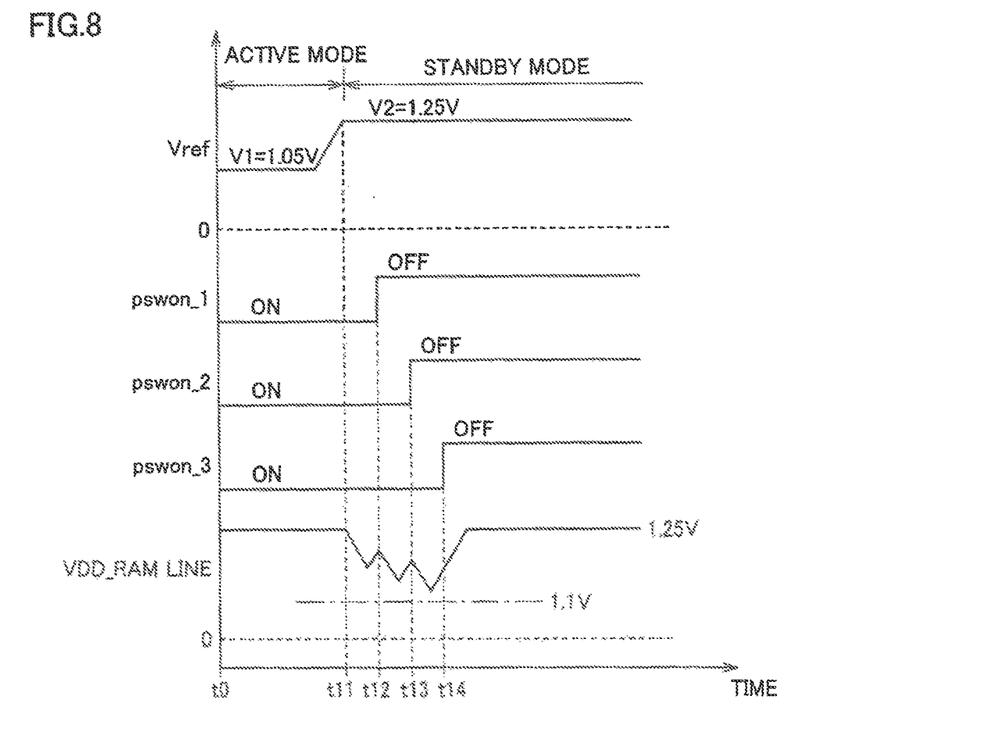
FIG. 8 is a timing chart showing the operation of the semiconductor device according to the third embodiment.

FIG. 8 is a timing chart showing the operation of the semiconductor device according to the third embodiment. FIG. 8 shows temporal changes in reference voltage Vref, control signal pswon and VDD_RAM line 35 when the semiconductor device shifts from the active mode to the standby mode.

Referring to FIG. 8, in the semiconductor device according to the third embodiment, when the semiconductor device shifts from the active mode to the standby mode, the plurality of PMOS switches 40_1, 40_2 and 40_3 forming PMOS switch circuit 40A are turned off with a time difference. Specifically, control signal pswon_1 (pswon_vdd, pswon_vdd_ram) is first rendered inactive to the H level and PMOS switch 40_1 is turned off (time t12). Next, control signal pswon_2 is rendered inactive to the H level and PMOS switch 40_2 is turned off (time t13). Finally, control signal pswon_3 is rendered inactive to the H level and PMOS switch 40_3 is turned off (time t14).

As described above, PMOS switches 40_1, 40_2 and 40_3 are turned off with a time difference, and thereby, the voltage of VDD_RAM line 35 decreases gradually every time the PMOS switches are turned off. An amount of decrease in voltage of VDD_RAM line 35 from when first PMOS switch 40_1 is turned off to when final PMOS switch 40_3 is turned off is smaller than an amount of decrease in voltage in the comparative example shown in FIG. 7. Therefore, it is possible to avoid the situation in which internal power supply voltage VDD_RAM becomes lower than the voltage (1.1 V) that allows data retention in SRAM memory cell 32. As a result, according to the third embodiment, voltage drop in VDD_RAM line 35 can be suppressed more effectively.

It is needless to say that the structure of PMOS switch circuit 40A shown in FIG. 6 is also applicable to the structure in which the two regulators (external regulator 3 and internal regulator 26) having different current supply capabilities are switched and used based on whether the semiconductor device is in the active mode or in the standby mode, as described in the related art.

Although the invention made by the inventors of the present invention has been specifically described based on the embodiments, the present invention is not limited to the aforementioned embodiments and it is needless to say that various modifications are possible within a scope of the general description.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A semiconductor device having an active mode and a standby mode as operation modes, comprising:
    a first power supply line supplied with a first internal power supply voltage from a first external power supply;
    an internal power supply circuit generating a second internal power supply voltage based on an external power supply voltage from a second external power supply circuit;
    a second power supply line supplied with said second internal power supply voltage from said internal power supply circuit;
    a switch circuit connected between said first power supply line and said second power supply line; and
    a control circuit controlling ON/OFF of said switch circuit, and
    said switch circuit includes:
    a first PMOS transistor having a source and an N-type well connected to said first power supply line;
    a second PMOS transistor having a source and an N-type well connected to said second power supply line and a drain connected to a drain of said first PMOS transistor;
    a first control signal generating unit for generating a first control signal inputted to a gate of said first PMOS transistor, and receiving a control command from said control circuit and a voltage of said second power supply line; and
    a second control signal generating unit for generating a second control signal inputted to a gate of said second PMOS transistor, and receiving said control command and a voltage of said first power supply line.

2. The semiconductor device according to claim 1, wherein
    said first control signal generating unit generates said first control signal in association with said control command, in a state where the voltage of said second power supply line has risen to said second internal power supply voltage, and
    said second control signal generating unit generates said second control signal in association with said control command, in a state where the voltage of said first power supply line has risen to said first internal power supply voltage.

3. The semiconductor device according to claim 2, wherein
said first control signal generating unit generates said first control signal to turn on said first PMOS transistor in accordance with said control command for said switch circuit to turn on, in the state where the voltage of said second power supply line has risen to said second internal power supply voltage, and
said second control signal generating unit generates said second control signal to turn on said second PMOS transistor in accordance with said control command for said switch circuit to turn on, in the state where the voltage of said first power supply line has risen to said first internal power supply voltage.

4. The semiconductor device according to claim 1, wherein
a plurality of said switch circuits are connected in parallel between said first power supply line and said second power supply line, and
at the time of shift from said active mode to said standby mode, said control circuit turns off said plurality of switch circuits with a time difference.

5. The semiconductor device according to claim 1, wherein
in said active mode, said internal power supply circuit generates said second internal power supply voltage such that said second internal power supply voltage is lower than said first internal power supply voltage.

6. The semiconductor device according to claim 5, further comprising:
a first internal circuit connected to said first power supply line, operating by said first internal power supply voltage in said active mode, and not receiving supply of said first internal power supply voltage in said standby mode; and
a second internal circuit connected to said second power supply line, operating by said first internal power supply voltage in said active mode, and operating by said second internal power supply voltage in said standby mode.

7. The semiconductor device according to claim 5, wherein
said internal power supply circuit includes:
a reference voltage generating unit that is configured to be capable of generating a plurality of reference voltages having different voltage levels, and that outputs one reference voltage selected from said plurality of reference voltages in accordance with said operation mode; and
a regulator generating said second internal power supply voltage by referring to said selected one reference voltage.

8. The semiconductor device according to claim 5, wherein
said internal power supply circuit includes:
a reference voltage generating circuit generating a reference voltage; and
a regulator generating said second internal power supply voltage by referring to said reference voltage, and
said regulator is configured to be capable of generating a plurality of said second internal power supply voltages having different voltage levels, and outputs one second internal power supply voltage selected from said plurality of second internal power supply voltages in accordance with said operation mode.

9. The semiconductor device according to claim 1, further comprising:
an SRAM memory cell coupled to said second power line; and
an SRAM peripheral circuit coupled to said first power line and configured to operate said SRAM memory cell.

10. The semiconductor device according to claim 1, further comprising:
an internal circuit coupled to said first power line and including a CPU and a rewritable non-volatile memory.

11. The semiconductor device according to claim 1, wherein
said internal power supply circuit includes a reference voltage generating circuit configured to generate a reference voltage obtained by stepping down said external power supply voltage.

12. The semiconductor device according to claim 11, wherein
said internal power supply circuit further includes an internal regulator configured to generate said second internal power supply voltage by referring to said reference voltage.

13. The semiconductor device according to claim 9, wherein
a first transistor included in said internal power supply circuit has a larger film thickness than that of a second transistor included in said SRAM peripheral circuit.

14. The semiconductor device according to claim 1, wherein
said first and second PMOS transistors are each formed by a transistor having a smaller film thickness than that of a transistor included in said internal power supply circuit.

* * * * *